US011353386B1

(12) United States Patent
Alsayegh et al.

(10) Patent No.: US 11,353,386 B1
(45) Date of Patent: Jun. 7, 2022

(54) APPARATUS FOR TESTING THE STABILITY OF DISPERSED PARTICLES IN FLOWING SUSPENSIONS

(71) Applicant: KUWAIT UNIVERSITY, Safat (KW)

(72) Inventors: Naser Alsayegh, Safat (KW); Ammar M. Bahman, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 17/182,193

(22) Filed: Feb. 22, 2021

(51) Int. Cl.
*G01N 11/02* (2006.01)

(52) U.S. Cl.
CPC .................................. *G01N 11/02* (2013.01)

(58) Field of Classification Search
CPC ..................................................... G01N 11/02
USPC ........... 73/54.01, 54.02, 54.23, 54.28–54.33, 73/54.35, 54.38, 54.43, 61.71, 61.73, 73/61.78, 866
See application file for complete search history.

(56) References Cited

U.S. PATENT DOCUMENTS

| 3,677,069 A | 7/1972 | Rubin et al. | |
| 3,777,551 A | 12/1973 | Weiss | |
| 5,315,863 A | 5/1994 | Cowper | |
| 2017/0101910 A1* | 4/2017 | Reinosa | ............... B01D 35/153 |
| 2021/0371769 A1* | 12/2021 | Monden | ............... C10M 125/02 |

FOREIGN PATENT DOCUMENTS

| DE | 10055420 A1 | 5/2002 |
| DE | 102007042109 A1 | 3/2009 |
| ES | 2188323 A1 | 6/2003 |

OTHER PUBLICATIONS

Gaydon, Peter. "How Viscosity Affects Pumping." Apr. 6, 2018. Printed from https://www.pumpsandsystems.com/how-viscosity-affects-pumping.

* cited by examiner

*Primary Examiner* — Robert R Raevis
(74) *Attorney, Agent, or Firm* — Nath, Goldberg & Meyer; Richard C. Litman

(57) ABSTRACT

The apparatus for testing the stability of dispersed particles in flowing suspensions includes a sample receiving cup having a lower wall and an open upper end. A cup outlet is disposed in the lower wall, and the sample receiving cup is adapted for receiving a suspension sample through the open upper end. A pump is in fluid communication with the sample receiving cup through the cup outlet. The pump extracts the suspension sample through the cup outlet to produce a pressurized suspension stream. A recirculation pipe has a pipe inlet and a pipe outlet, the pipe inlet being in fluid communication with the pump for receiving the pressurized suspension stream, and the pipe outlet returns the pressurized suspension stream to the sample receiving cup, through the open upper end thereof. A power monitor is in communication with the pump for monitoring the power output of the pump.

6 Claims, 6 Drawing Sheets

APPARATUS FOR TESTING THE STABILITY OF DISPERSED PARTICLES IN FLOWING SUSPENSIONS

BACKGROUND

1. Field

The disclosure of the present patent application relates to measurement and testing of fluids, and particularly to an apparatus for testing the stability of dispersed particles in flowing suspensions.

2. Description of the Related Art

There is great interest in enhancing the thermal performance of heat exchangers. Over the years, numerous approaches have been studied, such as through the modification of the geometry of the heat exchanger by adding external fins, inner turbulators and the like. Although these approaches have been quite successful in improving thermal transfer efficiency, it appears that little further improvement can be gained through changes solely to the heat exchange geometry. Thus, research has shifted towards improving the working fluids used in and with the heat exchangers.

Fluids of interest must necessarily have greater thermal transfer efficiencies than conventionally known fluids, and must also be operationally feasible. To meet these requirements, suspensions containing dispersed solid particles have become of great interest. Such suspensions include a hosting liquid (i.e., the "base fluid") with suspended solid particles on the order of micrometers or nanometers, resulting in so-called "microfluids" and "nanofluids", respectively. Since the thermal conductivity of the particles is at least an order of magnitude higher than the base fluid, dispersing the particles in the base fluid causes the overall (or "effective") thermal conductivity of the suspension to significantly increase.

In order for the suspension to reach optimal effective thermal conductivity, the particles must be homogenously dispersed in the base fluid, and must be maintained in physically stable condition. Meeting both requirements can be challenging, and there are a limited number of routes for the production of such suspensions. Primarily, either a one-step or a two-step approach may be used. In the one-step method, the particles are formed and dispersed in a single procedure, whereas in the two-step method, a dry powder is added to a base fluid, after which the particles and base fluid are mixed together using a dispersion device (e.g., an ultrasonicator, a homogenizer, magnetic stirring, etc.).

The one-step approach may result in a suspension having a higher dispersion physical stability, and also avoids the need to start with a dry powder, which can be difficult to handle and disperse, and must be both transported and stored. Despite these advantages, the one-step method also results in the production of unwanted residues due to incomplete reactions, and is also available for only a limited number of particle-base fluid combinations. For example, the one-step method cannot be used to produce a diamond-water suspension, since micro-diamonds and nano-diamonds can only be produced through chemical processes in the dry form.

The two-step method has the advantage that any combination of particles and non-dissolving base fluids can be used to produce the suspensions. Further, two-step methods are, in general, easier to perform and can be used for either mass or small size production. Additionally, the dry powders are typically widely commercially available. Due to these advantages, the two-step method is widely used by researchers in the field of advanced fluids. However, suspensions made by the two-step method have lower levels of dispersion physical stability than those created by the one-step method, although this can be improved through the addition of surfactants in the mixture at the fabrication stage, or by conducting surface functionalization on the particles.

A wide variety of different techniques are used to study the physical stability of such suspensions. Such approaches include the sedimentation photographical capturing method, dynamic light scattering (DLS), zeta potential analysis, the third harmonic method (i.e., the "3-$\omega$ method"), scanning electron microscopy (SEM) analysis, transmitted electron microscopy (TEM) characterization, spectral analysis, centrifugation, and particles size analysis. Out of all of these methods, only the use of a particles size analyzer can determine the physical stability of suspensions in their dynamic flow conditions, and these are the actual conditions any suspension would experience during real world applications. Unfortunately, particle size analysis has continuously been reported to overestimate the size of the dispersed particles, typically on the order of 2 to 10 nm greater than the actual size. Particle size analysis also occasionally overestimates the number of particles because the analyzer determines the particle's shadow to be an additional particle, in most cases. Thus, overall, the use of a particle size analyzer is unreliable for evaluating the physical dispersion stability of a suspension.

The 3-$\omega$ method, on the other hand, has been shown to be capable of determining the physical stability of dispersed particles through gradual changes in the effective thermal conductivity of the suspension. However, the presently used 3-$\omega$ physical stability evaluation approach deals with suspensions at their stationary shelving state. This is because the working fluid needs to be stationary to be able to measure the temperature difference ($\Delta T$) at a certain distance ($\Delta x$) and a given heat flux (q) for measuring the thermal conductivity (k) of a fluid. Fourier's law is used for measuring the thermal conductivity: $q=-k\ \Delta T/\Delta x$.

As discussed above, the presently used 3-$\omega$ method cannot reflect the actual working conditions that these fluids experience in real-world systems, i.e., in their flowing states. Thus, it would be desirable to be able to use a similar approach to determine the physical stability of both nanofluid and microfluid suspensions in the dynamic flow state. The primary difficulty in applying the 3-$\omega$ method to this problem is that it focuses on the thermal conductivity as the primary suspension property being measured. It would be desirable to be able to focus instead on a different measurable suspension property, such as fluid viscosity. Thus, an apparatus for testing the stability of dispersed particles in flowing suspensions solving the aforementioned problems is desired.

SUMMARY

The apparatus for testing the stability of dispersed particles in flowing suspensions includes a sample receiving cup having a lower wall and an open upper end. A cup outlet is disposed in the lower wall, and the sample receiving cup is adapted for receiving a suspension sample through the open upper end. A pump is in fluid communication with the sample receiving cup through the cup outlet. The pump extracts the suspension sample through the cup outlet to produce a pressurized suspension stream. A valve may be located between the cup outlet and the pump for controlling the flow of the suspension sample from the sample receiving cup to the pump.

A recirculation pipe has a pipe inlet and a pipe outlet. The pipe inlet is in fluid communication with the pump for receiving the pressurized suspension stream, and the pipe outlet returns the pressurized suspension stream to the sample receiving cup through the open upper end thereof. A power monitor is in communication with the pump for monitoring the power output of the pump. A thermal controller may also be in thermal communication with the sample receiving cup for adjusting the temperature of the suspension sample within the sample receiving cup.

In use, the sample receiving cup is initially at least partially filled with suspension sample. During filling, the valve may be closed to prevent any fluid flow to the pump. A homogenizer, homogenizing mixer or the like may be used to homogenize the suspension sample within the sample receiving cup. Following filling and homogenization, the valve may be opened and the pump may be actuated to generate the pressurized suspension stream, which is recirculated back to the sample receiving cup. The power output of the pump is monitored by the power monitor over time. An increase in power output of the pump indicates a degradation of stability of dispersed particles in the suspension sample. During operation, the temperature of the sample receiving cup and the suspension sample contained therein may be adjusted using the thermal controller.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
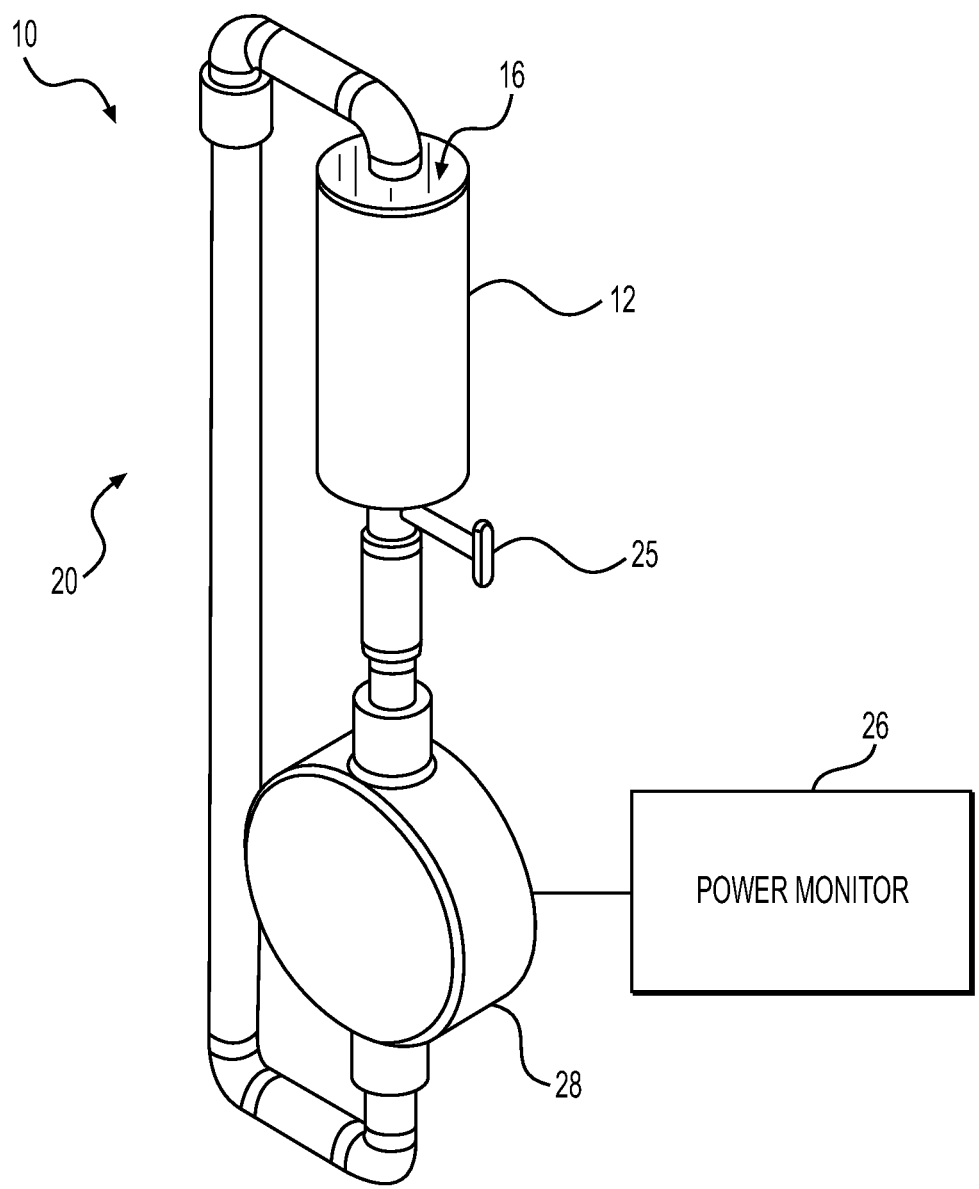
FIG. 1 is a perspective view of an apparatus for testing the stability of dispersed particles in flowing suspensions.
Figure 2:
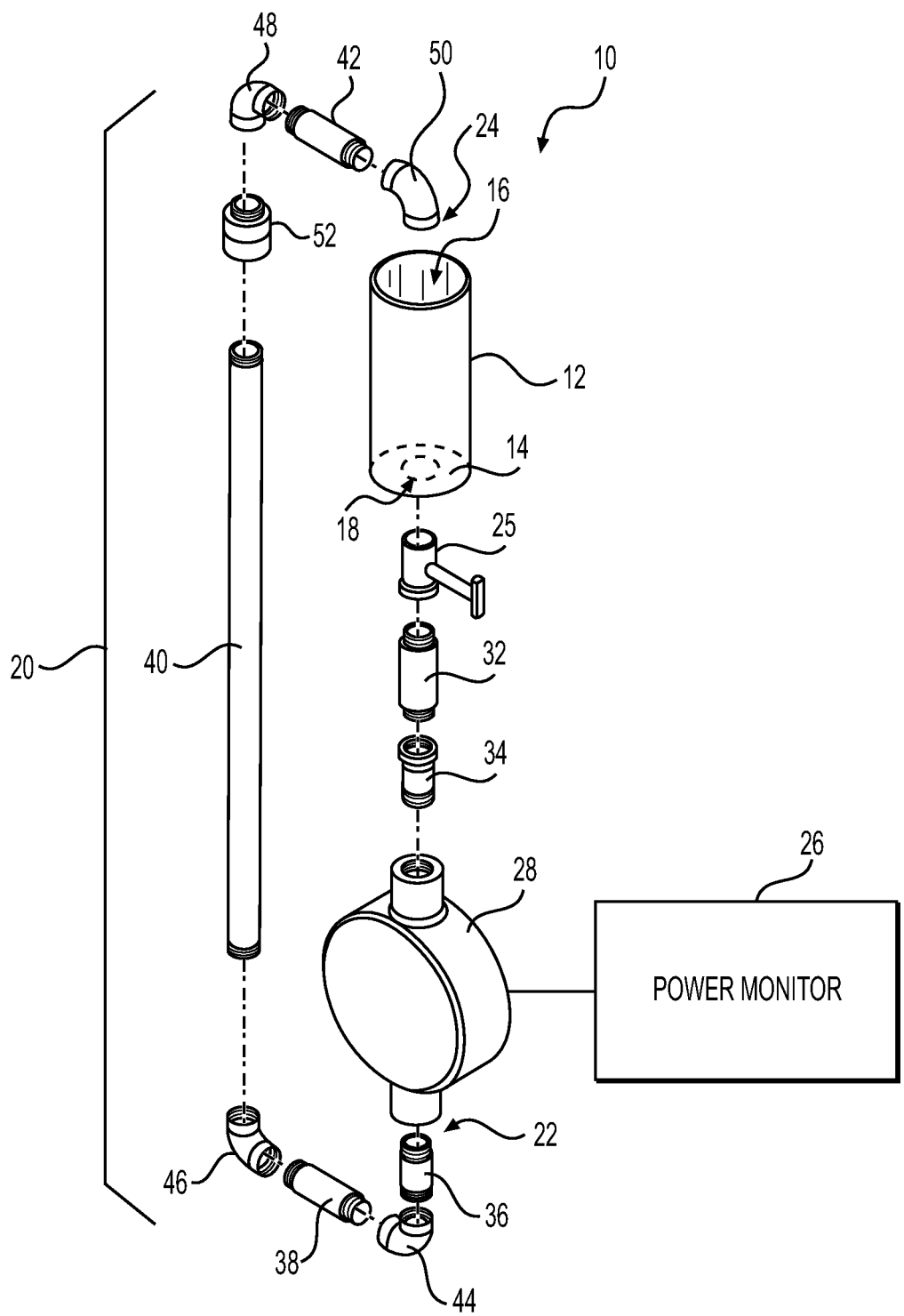
FIG. 2 is an exploded perspective view of the apparatus for testing the stability of dispersed particles in flowing suspensions.

Referring to FIGS. 1 and 2, the apparatus for testing the stability of dispersed particles in flowing suspensions, designated generally as 10 in the drawings, includes a sample receiving container or cup 12 having a lower wall 14 and an open upper end 16. It should be understood that the overall dimensions and configuration of the sample receiving cup 12 are shown for exemplary purposes only. A cup outlet 18 is disposed in the lower wall 14, and the sample receiving cup 12 is adapted for receiving a suspension sample through the open upper end 16.

A pump 28 is in fluid communication with the sample receiving cup 12 through the cup outlet 18. It should be understood that pump 28 is shown for exemplary purposes only, and that any suitable type of pump may be used. The pump 28 extracts the suspension sample through the cup outlet 18 to produce a pressurized suspension stream. A valve 25 may be located between the cup outlet 18 and the pump 28 for controlling the flow of the suspension sample from the sample receiving cup 12 to the pump 28. It should be understood that any suitable type of valve 25 may be used. Further, it should be understood that any suitable type of fittings may be used to connect the valve 25 to the pump 28. For example, FIG. 2 shows an exemplary cylindrical pipe 32 and exemplary male-to-female extender 34 between the valve 25 and the pump 28.

A recirculation pipe 20 is disposed between the pump 28 and the upper end 16 of the cup 12, and has a pipe inlet 22 and a pipe outlet 24. The pipe inlet 22 is in fluid communication with the pump 28 for receiving the pressurized suspension stream, and the pipe outlet 24 returns the pressurized suspension stream to the sample receiving cup 12 through the open upper end 16. It should be understood that the recirculation pipe 20 may have any suitable configuration, and that the multi-part configuration, as well as the overall dimensions and configuration in FIGS. 1 and 2 are shown for exemplary purposes only. Further, it should be understood that any suitable type of fittings may be used in or with recirculation pipe 20. For example, FIG. 2 shows the recirculation pipe 20 formed from a combination of exemplary cylindrical pipes 36, 38, 40 and 42, as well as exemplary elbow joints 44, 46, 48, 50, and exemplary rotating fitting 52, with exemplary elbow joint 50 defining the pipe outlet 24, and exemplary cylindrical pipe 36 defining the pipe inlet 22.

It should be understood that the sample receiving cup 12, recirculation pipe 20 and pump 28 may be formed from any suitable materials. For example, the sample receiving cup 12, recirculation pipe 20 and at least a portion of pump 28 may be made from glass or a high surface finish acrylic to eliminate surface friction on the dispersed particles within the flowing suspension and avoid particle deposition on the inner surfaces.

Figure 3:
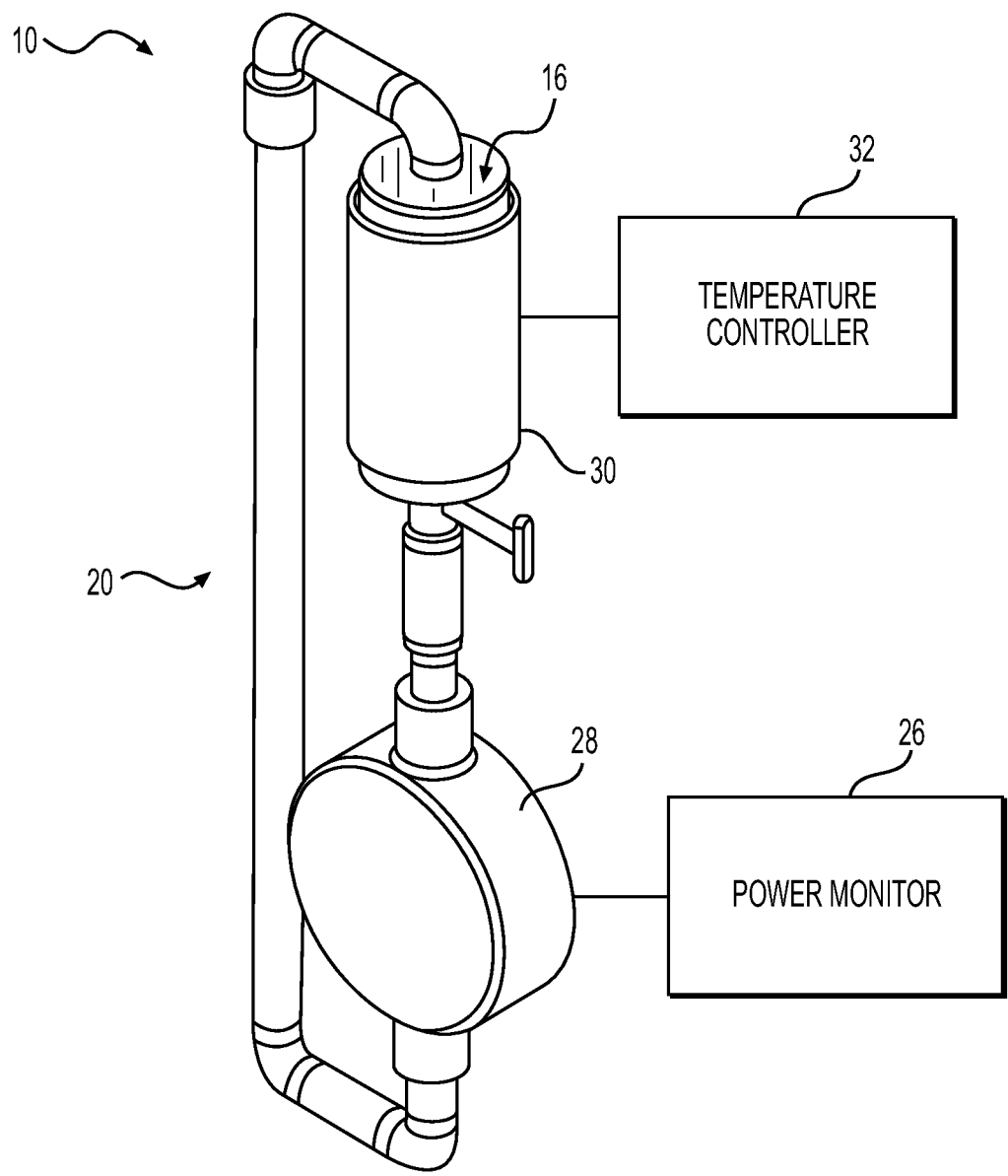
FIG. 3 is a perspective view of an alternative embodiment of the apparatus for testing the stability of dispersed particles in flowing suspensions.

A power monitor 26 is in communication with the pump 28 for monitoring the power output of the pump 28. As shown in FIG. 3, a heating/cooling jacket 30 controlled by a thermal controller 32 may also be in thermal communication with the sample receiving cup 12 for adjusting the temperature of the suspension sample within the sample receiving cup 12. During operation of the apparatus 10, the temperature of the sample receiving cup 12 and the suspension sample contained therein may be adjusted using the thermal controller 32.

Figure 4A:
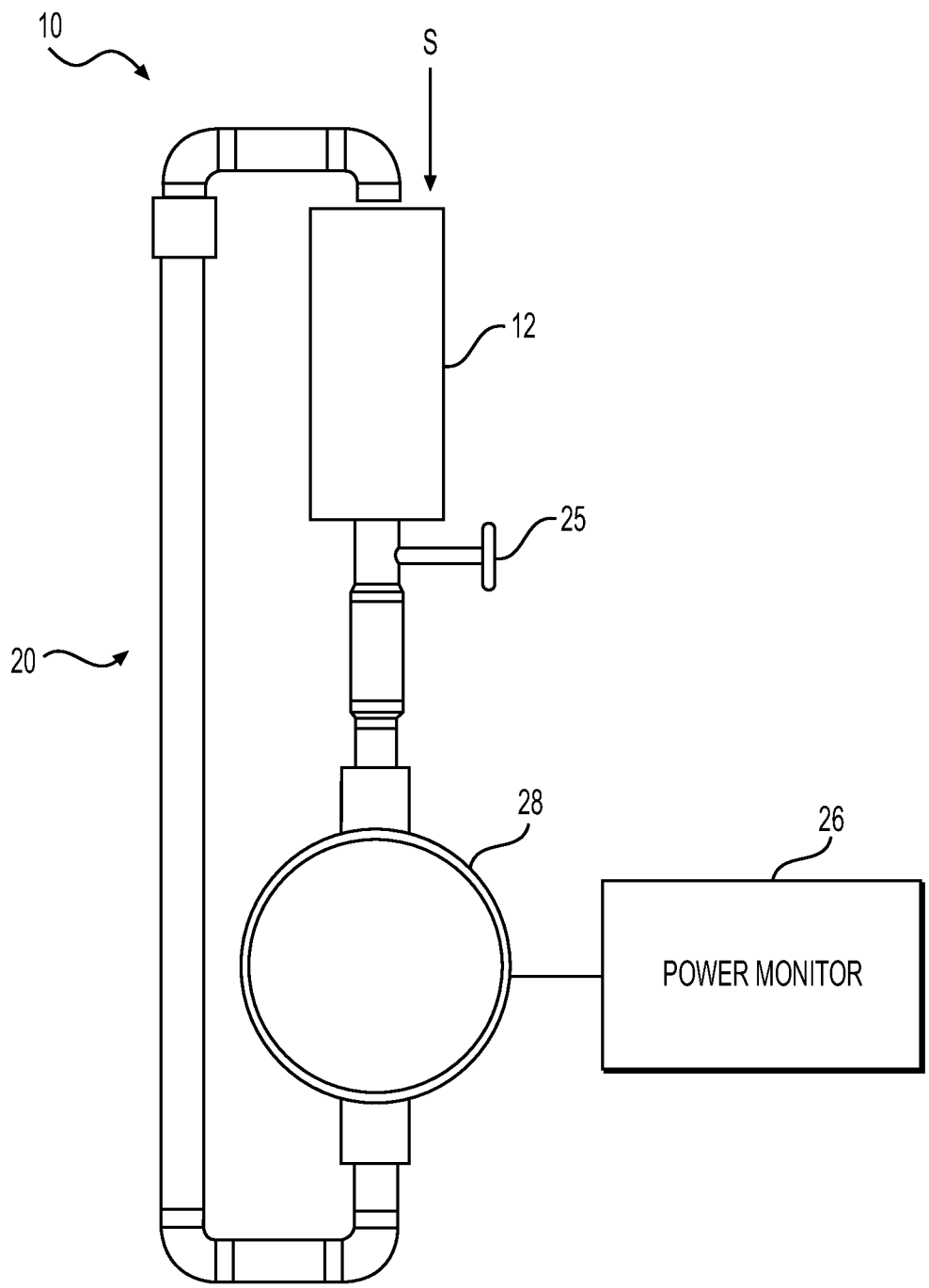
FIG. 4A is a side view of the apparatus for testing the stability of dispersed particles in flowing suspensions.
Figure 4B:
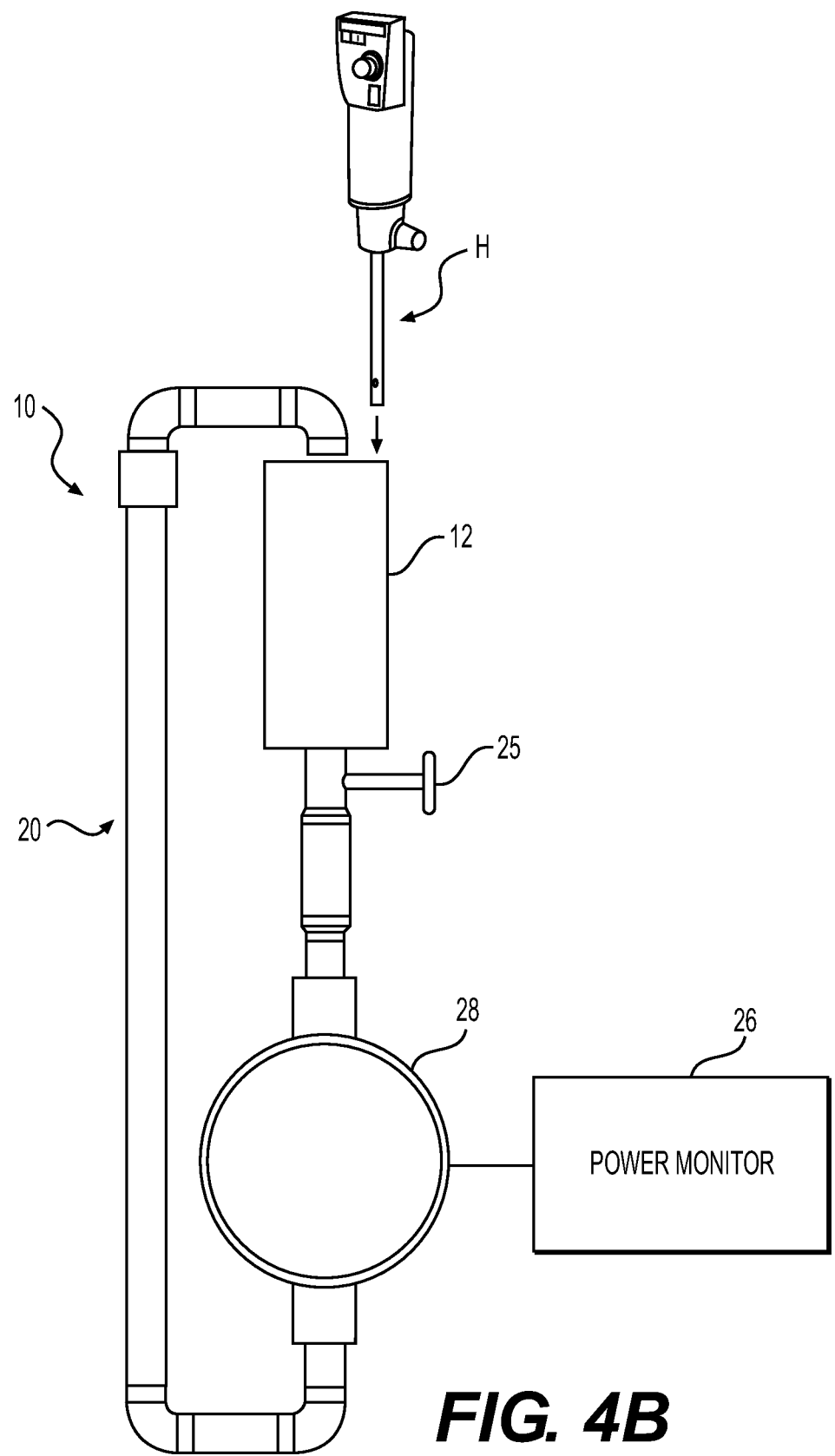
FIG. 4B is an environmental side view of the apparatus for testing the stability of dispersed particles in flowing suspensions.
Figure 4C:
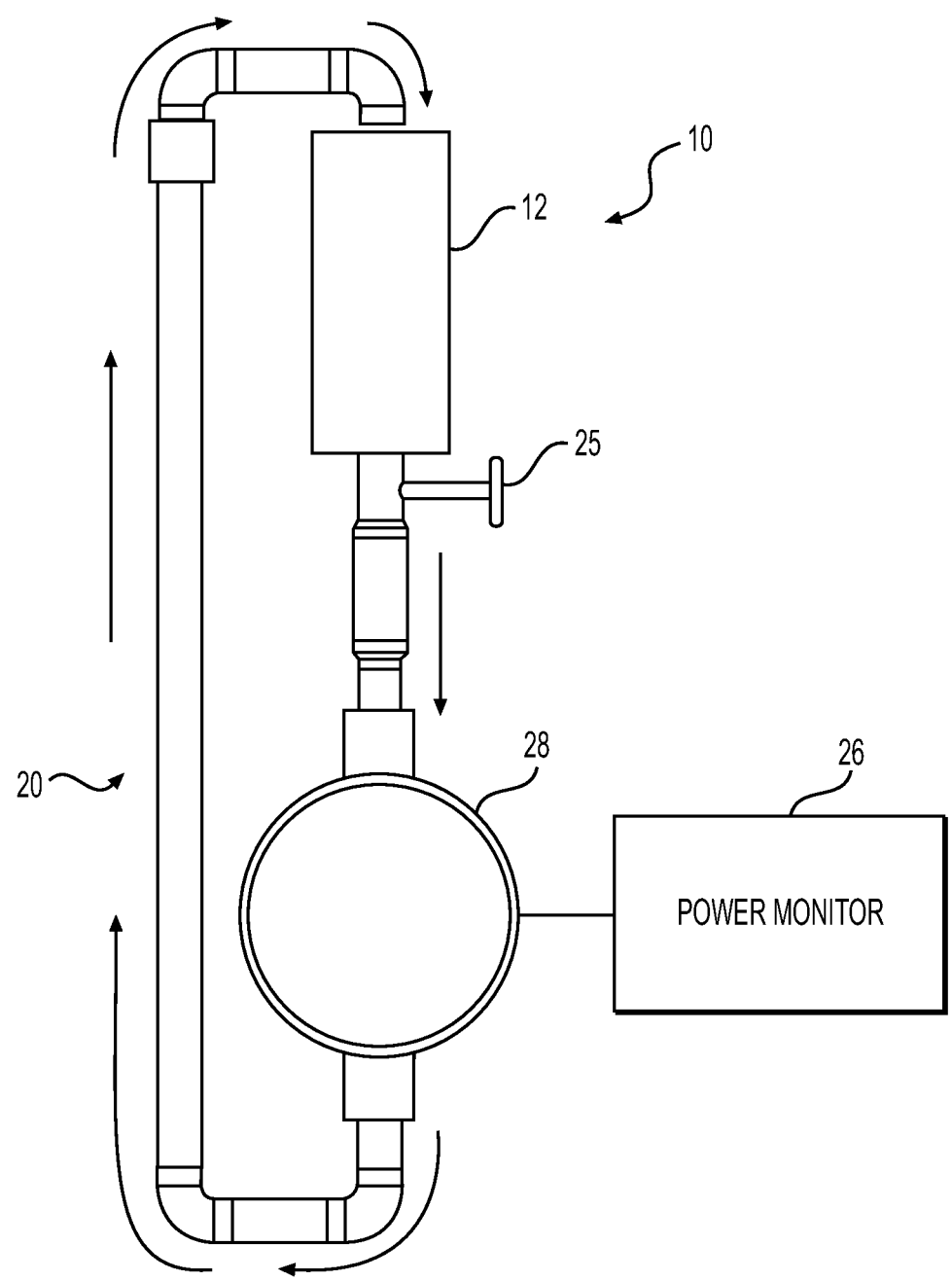
FIG. 4C is a side view of the apparatus for testing the stability of dispersed particles in flowing suspensions, indicating the flow path of the suspension through the device.

In use, as shown in FIG. 4A, the sample receiving cup 12 is initially at least partially filled with suspension sample S (the liquid and the solid particles may be pre-mixed, or may be loaded into the cup sequentially). During filling, the valve 25 may be closed to prevent any fluid flow to the pump 28. As shown in FIG. 4B, a homogenizer, homogenizing mixer or the like may be used to homogenize the suspension sample within the sample receiving cup 12. It should be understood that the conventional homogenizer H is shown in FIG. 4B for exemplary purposes only. Following filling and homogenization, the valve 25 may be opened and the pump 28 may be actuated to generate the pressurized suspension stream, which is recirculated back to the sample receiving cup 12, as shown in FIG. 4C. The power output of the pump 28 is monitored by the power monitor 26, over time. It should be understood that any suitable type of power monitor may be used to measure the power output of the pump 28. An increase in power output of the pump 28 indicates a degradation of stability of dispersed particles in the suspension sample S.

Changes in the power requirements for the pump 28, as monitored by power monitor 26 over time, indicate a change in the effective viscosity of the suspension sample S. For example, when the dispersed particles within the suspension sample S lose physical stability as a result of clustering or agglomeration between the particles, the effective viscosity of the suspension increases, consequently increasing the pumping power requirements. This increase in pumping power demand over time indicates that the suspension has lost physical stability of the dispersed particles. The closed loop of the recirculation system allows measurement to be taken in the flow suspension over time.

Following completion of the testing, the suspension sample can be extracted by rotation of elbow joint 48 away from the sample receiving cup 12. Prior to testing, it may be desirable to first flush the system with water, and then use the base fluid to fabricate the suspension prior to conducting any experimental tests. This can be performed with an open loop configuration, similar to that described above for extraction of the sample, post-testing.

It is to be understood that the apparatus for testing the stability of dispersed particles in flowing suspensions is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An apparatus for testing the stability of dispersed particles in flowing suspensions, comprising:

a sample receiving cup having a lower wall, an open upper end, and a cup outlet disposed in the lower wall, the sample receiving cup being adapted for receiving a suspension sample through the open upper end;

a pump in fluid communication with the sample receiving cup through the cup outlet, the pump producing a pressurized suspension stream;

a recirculation pipe having a pipe inlet and a pipe outlet, the pipe inlet being in fluid communication with the pump for receiving the pressurized suspension stream, the pipe outlet returning the pressurized suspension stream to the sample receiving cup; and a power monitor in communication with the pump for monitoring power output of the pump, the pump requiring greater power to maintain recirculation of the suspension when the particles have reduced stability in the suspension.

2. The apparatus for testing the stability of dispersed particles in flowing suspensions as recited in claim 1, further comprising a valve located between the cup outlet and the pump for selectively preventing flow of the suspension from the cup to the pump.

3. The apparatus for testing the stability of dispersed particles in flowing suspensions as recited in claim 2, further comprising a thermal controller in thermal communication with the sample receiving cup for regulating temperature of the suspension.

4. A method of testing the stability of dispersed particles in flowing suspensions, comprising the steps of:

at least partially filling a sample receiving cup with a suspension sample;

generating a pressurized stream of the suspension from the sample receiving cup with a pump;

recirculating the pressurized suspension stream back to the sample receiving cup; and monitoring power output of the pump over time, wherein an increase in power output of the pump indicates a degradation of stability of dispersed particles in the suspension sample.

5. The method of testing the stability of dispersed particles in flowing suspensions as recited in claim 4, further comprising the step of adjusting temperature of the sample receiving cup.

6. The method of testing the stability of dispersed particles in flowing suspensions as recited in claim 4, further comprising the step of homogenizing the suspension sample within the sample receiving cup.

* * * * *